US010602207B2

(12) United States Patent
Gao et al.

(10) Patent No.: US 10,602,207 B2
(45) Date of Patent: Mar. 24, 2020

(54) NEURAL NETWORK BASED CONTENT DISTRIBUTION IN AN ONLINE SYSTEM

(71) Applicant: Facebook, Inc., Menlo Park, CA (US)

(72) Inventors: Tianshi Gao, Fremont, CA (US); Xiangyu Wang, Menlo Park, CA (US); Ou Jin, Fremont, CA (US); Yifei Huang, Belmont, CA (US); Vignesh Ramanathan, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/054,871

(22) Filed: Aug. 3, 2018

(65) Prior Publication Data

US 2020/0045354 A1    Feb. 6, 2020

(51) Int. Cl.
*H04N 21/25* (2011.01)
*G06N 3/04* (2006.01)
*G06K 9/46* (2006.01)
*H04N 21/24* (2011.01)
*H04N 21/234* (2011.01)
*G06N 3/08* (2006.01)

(52) U.S. Cl.
CPC ............ *H04N 21/251* (2013.01); *G06K 9/46* (2013.01); *G06N 3/04* (2013.01); *G06N 3/08* (2013.01); *H04N 21/23418* (2013.01); *H04N 21/2408* (2013.01)

(58) Field of Classification Search
CPC ........... H04N 21/251; H04N 21/23418; H04N 21/2408; G06K 9/46; G06N 3/04; G06N 3/08
See application file for complete search history.

(56) References Cited

U.S. PATENT DOCUMENTS

| | | | | |
|---|---|---|---|---|
| 8,213,691 B2 * | 7/2012 | Jones | ............... | G06K 9/00288 345/621 |
| 8,831,358 B1 * | 9/2014 | Song | ............... | G06K 9/623 382/190 |
| 10,311,288 B1 * | 6/2019 | Dandekar | ......... | G06K 9/00288 |
| 2013/0262356 A1 * | 10/2013 | Bonastre | ............. | G06N 3/08 706/20 |
| 2014/0379729 A1 * | 12/2014 | Savage | ............. | H04L 65/403 707/748 |
| 2016/0048887 A1 * | 2/2016 | Joshi | ............. | G06K 9/00677 705/14.67 |
| 2019/0034764 A1 * | 1/2019 | Oh | ............. | G06K 9/6257 |

* cited by examiner

*Primary Examiner* — Pankaj Kumar
*Assistant Examiner* — Alexander Boyd
(74) *Attorney, Agent, or Firm* — Fenwick & West LLP

(57) ABSTRACT

An online system receives content items from a third party content provider. For each content item, the online system inputs an image into a neural network and extracts a feature vector from a hidden layer of the neural network. The online system compresses each feature vector by assigning a label to each feature value representing whether the feature value was above a threshold value. The online system identifies a set of content items that the user has interacted with and determines a user feature vector by aggregating feature vectors of the set of content items. For a new set of content items, the online system compares the compressed feature vectors of the content item with the user feature vector. The online system selects one or more of the new content items based on the comparison and sends the selected content items to the user.

20 Claims, 7 Drawing Sheets

NEURAL NETWORK BASED CONTENT DISTRIBUTION IN AN ONLINE SYSTEM

BACKGROUND

Field of Invention

This disclosure relates generally to the distribution of content by online systems, and in particular, to neural network based distribution of content items comprising images by online systems.

Description of Related Art

Online systems, such as social networking systems, allow users to connect to and communicate with other users of the online system. Online systems provide content items to users, for example, content items provided by third party systems. Often content items include images or videos. Online systems aim to provide content items to users that are likely to interact with them. Online systems predict likelihood of a user being interested in a given content item using various techniques such as machine learning techniques.

Content items are often presented to users that may not be interested in the content thereby providing a poor user experience. One reason is that conventional systems have limited information about exactly what the content contains, such as details about what entities appear in images presented in content items. And conventional systems have no efficient way to map details about content items across potentially millions of content items to specific interests of potentially millions of users of the online system. Conventional techniques do not effectively distribute content items to users who have interests aligning with the content of the presented content item, thereby providing a poor user experience.

SUMMARY

An online system distributes content items received from third-party content providers to users of the online system. The online system generates content feature vectors describing images associated with content items, for example, using a neural network and compares each content feature vector to a user feature vector associated with a user of the online system. A content feature vector comprises an array of feature values describing the likelihood that an image includes a specific feature. Based on the comparison of the content feature vector for a content item and the user feature vector, a set of content items are selected to be presented to the user within the online system.

In an embodiment, the online system receives a plurality of content items from a third party content provider. Each content item of the plurality comprises at least one image for which a feature vector is generated. The online system extracts a feature vector including an array of feature values for content items and compresses the feature vector by assigning a label to each feature value. For the compressed feature vector, the assigned label represents whether the corresponding feature value was above a threshold value. Additionally, in some embodiments, because the labels assigned to the compressed feature vector are binary values as compared to the range of feature values assigned to the initially extracted feature vectors, the compressed feature vectors are stored more efficiently within the computer memory or on storage devices and occupy less storage space. The online system identifies a set of content items that a user has interacted with in the past and determines a user feature vector by aggregating the compressed feature vectors corresponding to the identified content items.

The online system receives a new set of content items. For each content item, the online system compares the compressed feature vector for the content item with the user feature vector. The online system selects one or more content items from the new set of content items based on the comparison and sends the one or more selected items to the user of the online system.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

Overview

An online system, such as a social networking system, is used by content providers to distribute content. Content providers in an online system such as a social networking system may be users of the online system or third party systems. In some embodiments, the online system acts as the content provider by automatically generating content items, for example, news feed generated based on user actions or other events. For example, a social networking system may generate a thumbnail based on an image of a video uploaded by a user and provide the thumbnail along with a brief description of the video to other users. Content providers provide content items, for example educational content items, content items describing sports, content items describing current news, and so on. Depending on the content or category of content included within each content item, users of the online system may or may not be interested in the content item. For example, some content items may include content that a certain demographic of users would be interested in and interact with whereas another demographic of users may ignore that content item. For an online system, presenting content items of no interest to a user reduces the quality of the user experience that the online system provides.

Furthermore, distributing content items that a user is not likely to be interested in wastes computing and communication resources. For example, the computing resources and communication resources used to send all content items that users never accessed are wasted. Accordingly, the disclosed techniques improve the efficiency of computation and communication of online systems. For example, an online system S1 that can predict a likelihood of users accessing content items with 20% success is significantly more efficient compared to an online system S2 that can only predict the likelihood of users accessing the content item with 2% success or an online system S2 that does not perform any prediction analysis and distributes any content to any users. Accordingly, the system S1 uses the communication and computation resources more efficiently compared to either system S2 which wastes the computation resources of the computer. Embodiments compare a representations of content items to a representation of a user's interest in content items to identify content items which have a high likelihood of user interaction.

System Architecture

Figure 1:
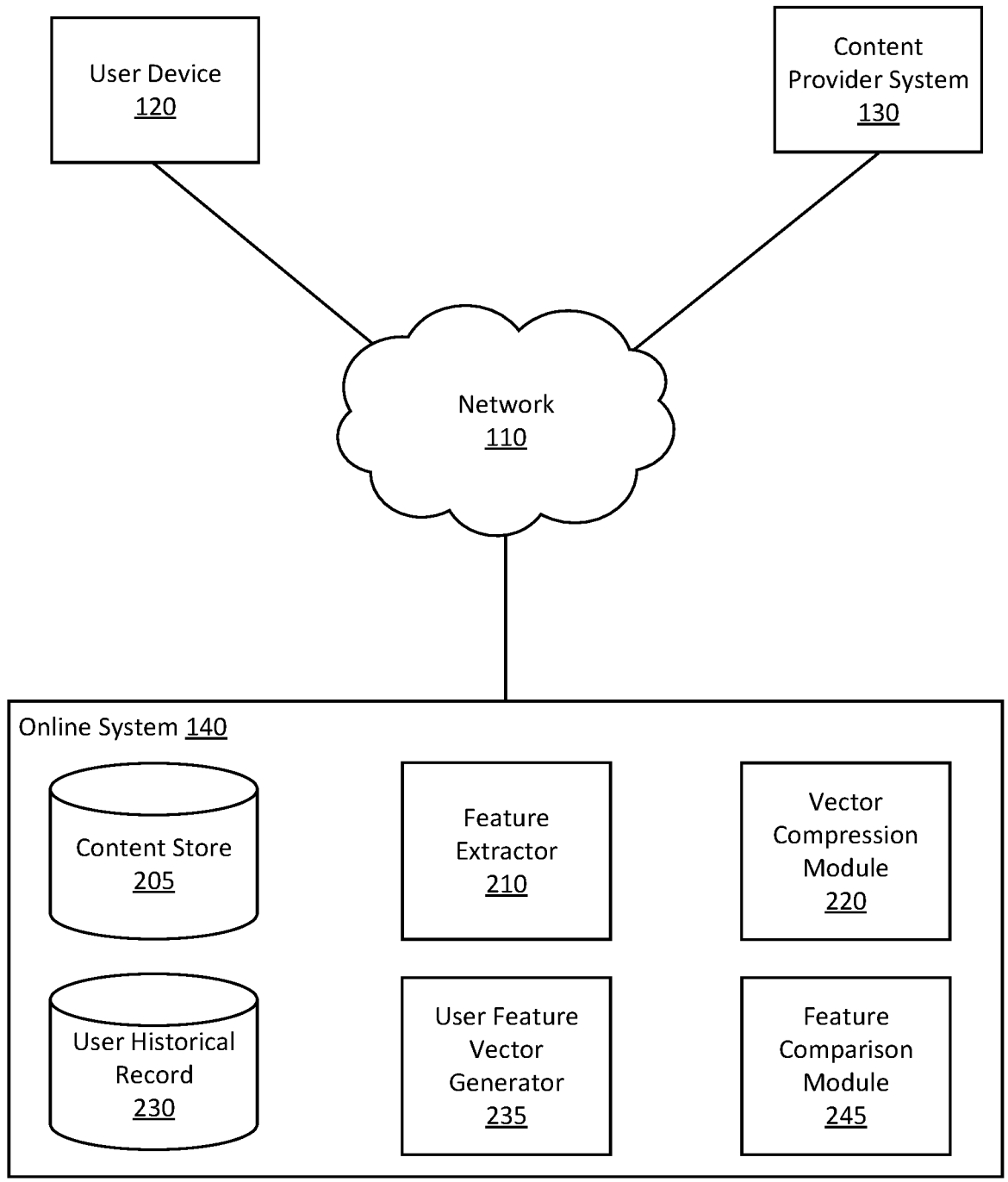
FIG. 1 is a high-level block diagram of a system environment, in accordance with an embodiment of the invention.

FIG. 1 is a block diagram of a system environment 100, in accordance with embodiment. In the embodiment shown by FIG. 1, the system environment comprises a user device 120, the content provider system 130, a network 110, and an online system 140. However, in other embodiments, the system environment 100 may include different and/or additional components.

The content provider system 130 is a computing device capable of receiving user input with data processing and data communication capabilities. Examples of the content provider system 130 include desktop computers, laptop computers, portable computers, personal digital assistants, smart phones or any other device including computing functionality and data communication capabilities. Content provider system 130 communicates with the online system 140 via the network 110. In one embodiment, a content provider system 130 executes a client application allowing a user of the content provider system 130 to interact with the online system 140. A content provider system 130 may also be used by a user that provides content items associated with a third party to the online system 140 for distribution to the users of the online system 140. The third party may be associated with a third party website. The third party website provides web pages to client devices that send a request to the third party website, for example, a hypertext transfer protocol (HTTP) request.

Similarly, a user device 120 is a computing device capable for receiving input with a data processing and data communication abilities. Functionally, the above description of the content provider system 130 can also apply to the user device 120. User devices 120 may be used by a user of the online system 140 that consumes the services offered by the online system 140, for example, a member of a social networking system. Content received by the online system 140 from the content provider system 130 is targeted and presented to users of the online system 140 through user devices 120.

Interactions between the content provider system 130, the user device 120, and the online system 140 are typically performed via the network 110, which enables communication between the user device 120, the content provider system 130, and the online system 140. In one embodiment, the network 110 uses standard communication technologies and/or protocols including, but not limited to, links using technologies such as Ethernet, 802.11, worldwide interoperability for microwave access (WiMAX), 3G, 4G, LTE, digital subscriber line (DSL), asynchronous transfer mode (ATM), InfiniBand, and PCI Express Advanced Switching. The network 110 may also utilize dedicated, custom, or private communication links. The network 110 may comprise any combination of local area and/or wide area networks, using both wired and wireless communication systems.

The online system 140 provides the medium for content distribution from content providers to users via user devices 120, as further described below. The online system 140 receives content from the content provider system 130 via the network 110 and processes the received content. After processing the received content, the online system 140 may identify users of the online system 140 to whom the content should be provided and accordingly present the content. In one embodiment, the online system 140 includes a content store 205, a feature extractor 210, a vector compression module 220, a user historical record 230, a user feature vector generator 235, and a content comparison module 245, each of will be described below in reference to FIG. 2. In some embodiments, the online system 140 includes additional modules or components, as will be described further in reference to FIG. 2.

Figure 2:
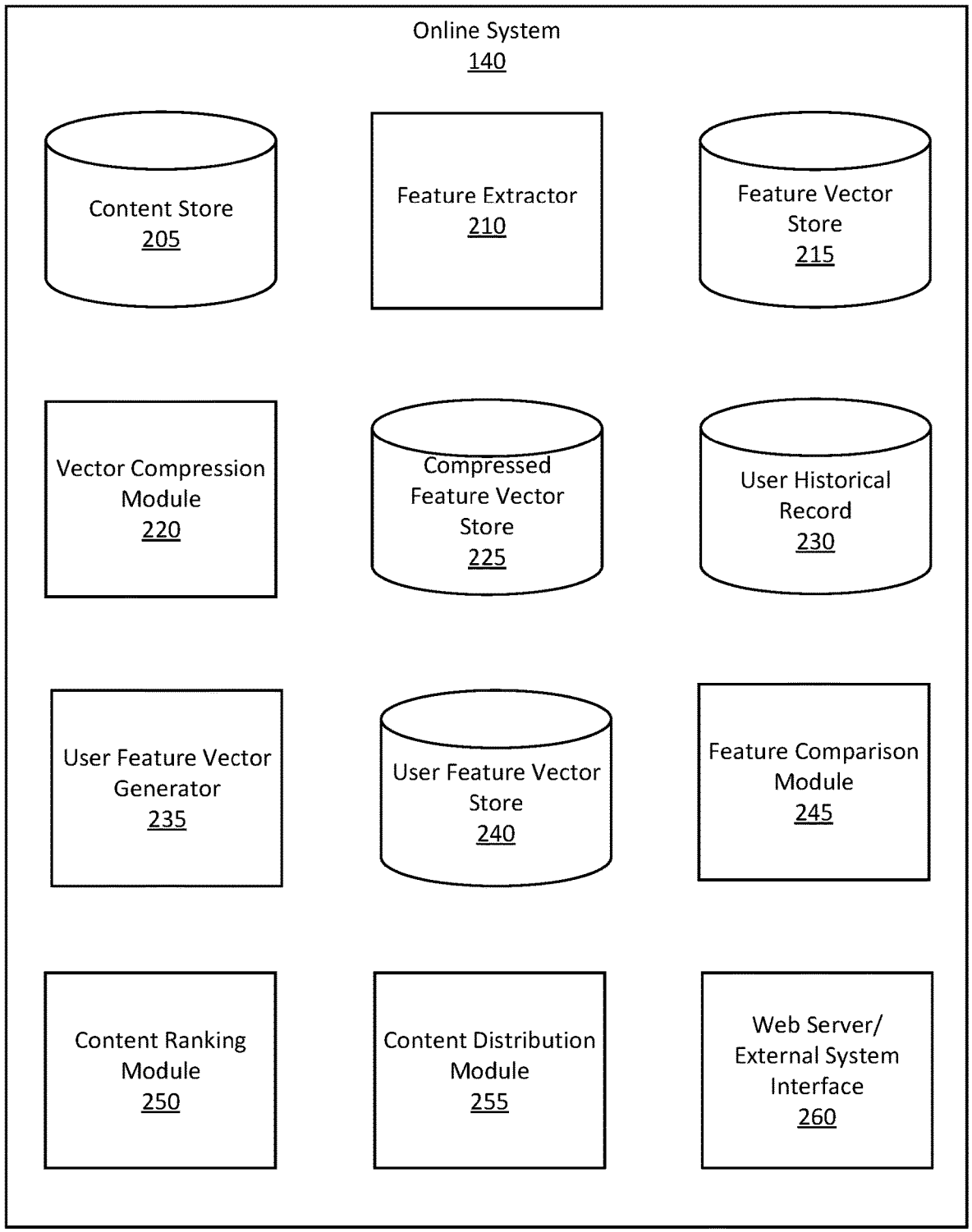
FIG. 2 is a block diagram of the system architecture of the online system 140, according to an embodiment

FIG. 2 is a block diagram of the system architecture of the online system 140, according to an embodiment. The online system 140 includes a content store 205, a feature extractor 210, a feature vector store 215, a vector compression module 220, a compressed feature vector store 225, a user historical record 230, a user feature vector generator 235, a user feature vector store 240, a feature comparison module 245, a content ranking module 250, a content distribution module 255, and a web server 260.

The content store 205 stores content items, for example, content items received from content provider (e.g., content items received from the content provider system 130). The content store 205 also stores metadata associated with each content item with in the online system 140, for example, the user account associated with the content provider system 130, targeting criteria associated with the content item that describe attributes of users to whom the content item should be directed, and so on.

In various embodiments, a content item includes various components capable of being identified and retrieved by the online system 140. Example components of a content item include: a title, text data, image data, audio data, video data, a landing page, a user associated with the content item, or any other suitable information. The online system 140 may identify or retrieve one or more specific components of a content item for presentation in some embodiments. For example, the online system 140 may identify an image from a content item and provide the image for presentation rather than the content item in its entirety.

Various content items may be associated with an objective that a content provider of the content item expects users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item and the content item or interactions between the users and objects associated with the content item. Additionally, the online system 140 receives compensation from a user or content provider associated with a content item as online system users perform interactions with a content item that satisfy the objective included in the content item.

In particular embodiments, content within the online system 140 may be associated with one or more privacy settings. Although the examples discussed herein are in the context of an online social network, the privacy settings may be applied to any other suitable computing system. Privacy settings, also referred to as "access settings," for a content item may be stored in any suitable manner, for example in association with the content item in an index on an authorization server, in another suitable manner, or in any combination of suitable manners. A privacy setting for an object may specify how the content item may be accessed, stored, or otherwise used (i.e., viewed, shared, modified, copied, executed, surfaced, or identified) within the online system 140. In one embodiment, a user of the online system 140 may specify privacy settings for a user account that identify a set of users that may access work-experience information on the user account, thus excluding other users from accessing that information. Similarly, privacy settings may specify a "blocked list" of users or other entities that may not access certain information associated with the object, including content providers. For example, a user may specify a set of users who may not access images associated with the user, thus excluding them from accessing the images while simultaneously allowing certain users not within the specified set of users to access the images.

Privacy settings associated with a content item may specify any suitable granularity of permitted access or denial of access. For example, access or denial of access may be specified for particular users of the online system 140, users of the online system within a specified degree of separation, users within a particular group or network, or users associated with a third party content provider. The privacy settings as described herein may describe any suitable granularity of permitted access or denial of access.

In some embodiments, different content items of the same type associated with a certain user may have different privacy settings. Different types of objects associated with a user may have different types of privacy settings. For example, a first user may specify that a first user's posted content is available to be viewed by the public, but any images shared by the first user are available only to the first user's friends in the online social network. As another example, a first user may specify a group of users that may view videos posted from the first users while keeping videos from being available to certain users connected to the first user. In some embodiments, different privacy settings may be established by the online system 140 for different users groups or user demographics.

In some embodiments, a user may specify whether particular types of content items or information associated with the first user may be accessed, stored, or used by the online system 150. For example, the first user may specify that images sent by the first user through the online system 140 may not be stored by the online system 140. As another example, a first user may specify that messages sent from the first user to a particular second user may not be stored by the online system 140. As a further example, a first user may specify that all content items sent via a particular application may be saved by the online system 140.

In additional embodiments, privacy settings may allow a first user to specify whether particular content items or information associated with the first user may be accessed from particular providers. The privacy settings may allow the first user to opt in or opt out of having objects or information accessed from a particular device (e.g., the phone book on a user's client device), from a particular application (e.g., a messaging application), or from a particular system (e.g., an email server). The online system 140 may provide default privacy settings with respect to each device, system, or application, and/or the first user may be prompted to specify a particular privacy setting for each context. For example, the first user may utilize a location-services feature of the online system 140 to provide recommendations for restaurants or other places in proximity to the user. The first user's default privacy settings may specify that the online system 140 may use location information provided from a client device of the first user to provide the location-based services, but that the online system 140 may not store the location information of the first user or provide it to any content provider. The first user may then update the privacy settings to allow location information to be used by a third-party image-sharing application in order to geo-tag photos.

The feature extractor 210 receives content items including at least one image and extracts a feature vector describing the graphical attributes of the images. In one embodiment, the feature extractor 210 implements an autoencoder that takes an input, encodes an input, and regenerates an output that matches the input. For example, the autoencoder may be configured to receive a sequence as an input, encode the sequence to a feature vector representation, and regenerate the input sequence as the output. The feature vector representation is a compressed version of the input sequence, for example the pixels of an image. In one embodiment, the feature vector representation has a fixed number of dimensions (or elements), independent of the size of the input sequence. A feature vector may be stored as an array of feature values, each of which describes the features or properties of an image. For example, a feature vector includes one feature value describing the presence of the color blue and a second feature value describing the presence of a basketball. An integer label can be assigned to each feature value describing a level of confidence or level of severity for that feature. In one implementation, the feature value is a whole number within a defined range where numbers closer to a particular limit, for example, the upper limit of the range, indicate a higher level of confidence in the presence of that feature in the image. In another implementation, the feature value is a fraction between two predetermined values, for example, 0 and 1, where values closer to 1 indicate a higher level of confidence. Feature vectors and their application are further described below in reference to the vector compression module 220 and the user feature vector generator 235.

To extract a feature vector, the feature extractor 210 uses a neural network to generate vector representations with one or more dimensions representing features of an image. The neural network comprises an input layer, and an output layer and optionally one or more hidden layers. In an embodiment, the neural network is a convolutional neural network that takes an image as input. In an embodiment, the neural network is an autoencoder that is configured to take an image as input and generate the input image as output. The neural network reduces the dimensions representing the image in the hidden layers. In some examples, the output image can be of a lower resolution as compared to the input image.

The feature extractor 210 selects feature vectors from a hidden layer of the neural network that provides input to the output layer of the neural network. In an embodiment, the feature extractor 210 receives a dataset in which most of the images are unlabeled. In an iteration, the neural network is trained using only the labeled samples from the original dataset. In one implementation, the labels for each sample are assigned based on a comparison of the feature value to a threshold feature value. In an alternate implementation, the label is assigned to each feature vector of the training dataset based on an indication of whether the user has interacted with the content of or related to the feature vector. At the end of each iteration, the trained neural network runs a forward pass on the entire dataset to generate feature vectors representing sample data at a particular layer. These data samples are then labeled, and are added to the labeled sample set, which is provided as input data for the next training iteration. Once extracted, feature vectors for content items are stored within the feature vector store 215. Neural networks and feature vectors are further described below in reference to FIG. 3.

A feature vector of the feature vector store 215 is input to the vector compression module 220 to be reconfigured into a compressed feature vector that is represented using a format that occupies less storage space in computer memory than the uncompressed feature vector. The vector compression module 220 determines a threshold value for each feature value bifurcating the range of potential feature values into a first range indicating that a feature is present in an image and a second range indicating that a feature is not present in an image. Any values above the threshold value are assigned a common label indicating that the feature is present and any values below the threshold value are assigned an alternate label indicating that the feature is not present. In alternate embodiments, values below the threshold value are assigned a common label indicating that the feature is present and values above the threshold value are assigned an alternate label indicating that the feature is not present.

As a result, the feature vector with a diverse array of feature values is processed into a compressed feature vector with an array of binary feature values. For example, for a feature value with a threshold value of 0.6, any feature values between 0.0 and 0.6 are assigned a "0" while feature values between 0.6 and 1 are assigned a "1." As an additional example, at threshold values of 0.5, a feature vector <0.1, 0.6, 0.7, 0.2> is compressed into a compressed feature vector <0, 1, 1, 0>. Given the reduced amount of data required to store an array of binary feature values, a compressed feature vector is more efficiently stored in computer memory compared to the initial feature vector. Such compressed feature vectors are stored within the compressed feature vector store 225.

In embodiments in which a feature value is equivalent to a threshold value, the appropriate label may be assigned based on a set of rules prescribed by an administrator or authorized personnel of the online system 140. In some embodiments, the threshold value is received from an authorized user of the online system 140. In alternate implementations, the threshold value is determined by the online system 140 based on feedback describing labels assigned to previous images or content items, for example using machine learning techniques. Examples of machine learning techniques include, but are not limited to, linear regression, decision trees, support vector machines, classifiers (e.g., a Naïve Bayes classifier), fuzzy matching, and gradient boosting.

The user historical record 230 stores a historical record describing content items with which the user has interacted or expressed an interest in. Examples of interactions between a user of the online system 140 and a content item include, but are not limited to, viewing a content item, hovering over a content item, clicking a content item, forwarding a content item, or saving a content item. In some implementations, the interaction between the content item and user may be assigned a weight based on the type of interaction. For example, if a user saves a first content item and clicks on a second content item, the first content item may assigned a weight indicating a greater level of interest to the user than the second content item.

The user feature vector generator 235 receives, from the compressed feature vector store 225, compressed feature vectors for content items with which the users has interacted with or expressed an interest in and aggregates them into a user feature vector representing the features of images that a user is likely to be interested in. Once generated, the array of a user feature vector comprises binary labels describing whether images with which the user has interacted with reflect the feature. In one embodiment, the user feature vector generator 235 aggregates compressed feature vectors into a user feature vector, by applying a binary "and" operator to feature values describing the same feature across multiple compressed feature vectors of images or content items. Using the binary "and" operation, the user feature vector generator 235 removes features values from the compressed feature vector that are not common across the images that the user interacted with and aggregates the remaining feature values into a user feature vector. In some implementations, the user feature vector is generated by aggregating feature vectors that have not been compressed into binary feature arrays. In some embodiments, the user feature vector generator 235 assigns a particular value V to a feature of the user feature vector if more than a threshold percentage of content items that the user interacted with have that value V for the corresponding feature. For example, if more than 90% of content items that the user interacted with have a feature F having value 1, the user feature vector generator 235 assigns value 1 for that feature in the user feature vector. In other embodiments, the user feature vector generator 235 uses other criteria based on statistical information describing features of the content items to determine a value of the corresponding user feature. Once generated, the user feature vectors are stored in the user feature vector store 240. The user feature vector generator 235 is further described below in reference to FIG. 4A-4B.

The feature comparison module 245 receives a user feature vector from the user feature vector store 240 and compressed feature vector representing an image for a content item from the compressed feature vector store 225. The compressed feature vector represents an image for a content item stored within the content store 205 that is a candidate to be presented to a user of the online system 140. The user feature vector represents an aggregate feature vector based on the historical record of content items that the user has already interacted with. The feature comparison module 245 compares corresponding feature values of the user feature vector and the compressed feature vector and determines a score based on the comparison. A compressed feature vector sharing a large number of feature values with the user feature vector is scored higher than a compressed feature vector sharing a fewer number of feature values. The compressed feature vector representation allows efficient comparison of two sequences that may have different number of elements since the feature vectors of both sequences has the same number of elements. Accordingly, embodiments use distance metrics such as Euclidian distance or hamming distance metrics to compare the feature vector representations of the sequences.

Using the scores for each content item, the content ranking module 250 ranks content items in order of highest score to lowest, or in alternate implementations in order of lowest score to highest. From the ranked list generated by the content ranking module 250, the content distribution module 255 selects and presents content items relevant to users of the online system 140. The content distribution module 255 identifies and excludes content items corresponding to low comparison scores. From the remaining content items, the content distribution module 255 selects one or more of the remaining content items. In an embodiment, the content distribution module 255 restricts distribution of content to content items with comparison scores above a threshold score.

The web server 260 links the online system 140 via the network 110 to the one or more user devices 120, as well as to the one or more providers 130. The web server 260 serves web pages, as well as other content, such as JAVA®, FLASH®, XML and so forth. The web server 260 may receive and route messages between the online system 140 and the user device 120, for example, instant messages, queued messages (e.g., email), text messages, short message service (SMS) messages, or messages sent using any other suitable messaging technique. A user may send a request to the web server 260 to upload information (e.g., images or videos) that are stored in the content store 205. Additionally, the web server 260 may provide application programming interface (API) functionality to send data directly to native client device operating systems, such as IOS®, ANDROID™, or BlackberryOS.

Figure 3:
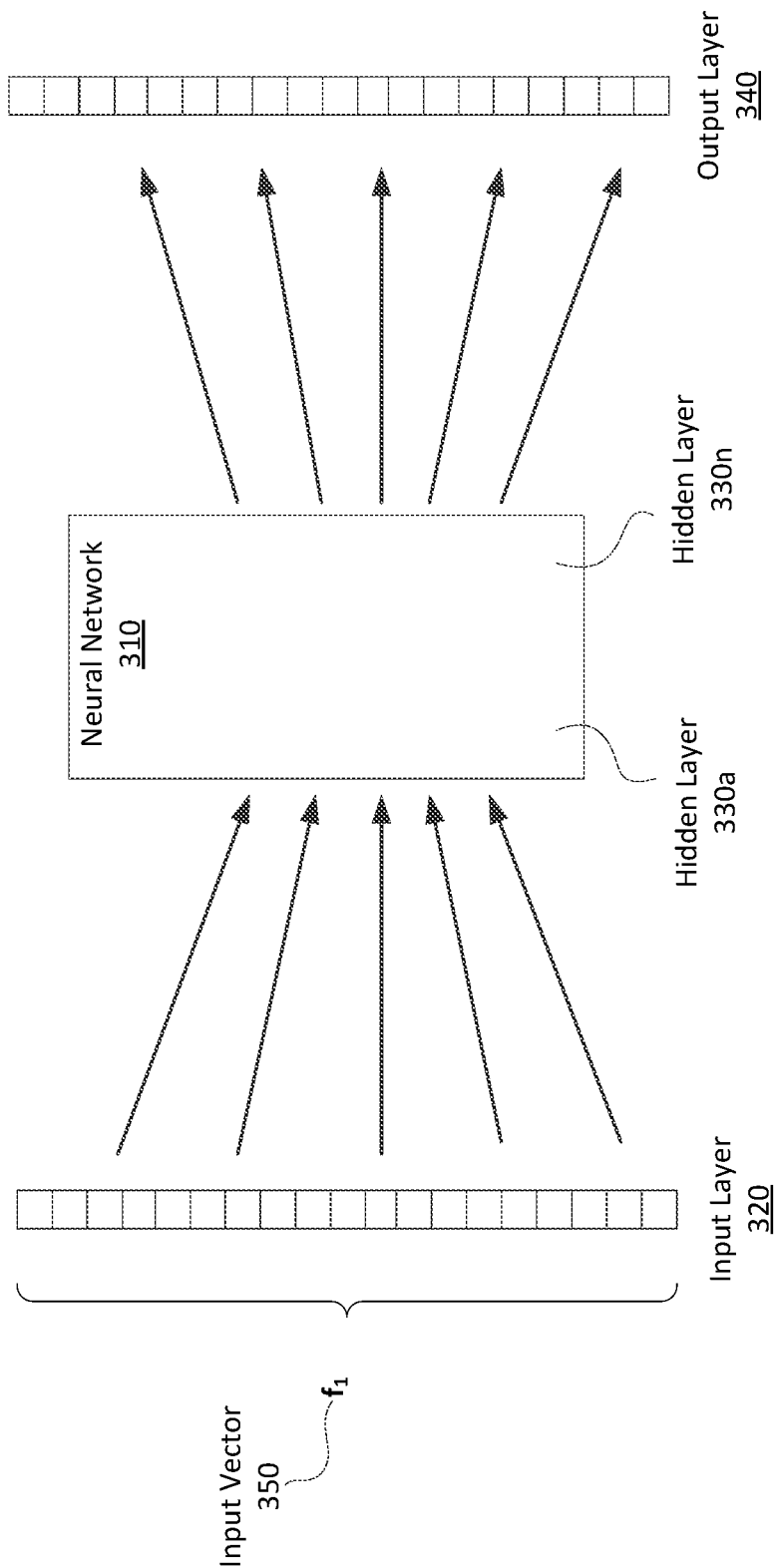
FIG. 3 shows a diagram of an exemplary neural network maintained by the feature extractor, in accordance with an embodiment of the invention.

To extract feature vectors from images associated with content items of content store 205 or the user historical record 230, the feature extraction 210 implements a neural network to receive the image as an input. FIG. 3 shows a diagram 300 of an exemplary neural network maintained by the feature extractor (e.g., feature extractor 210), in accordance with an embodiment of the invention. The neural network 310 is stored in a feature extractor 210 associated with the online system (e.g., online system 140). The neural network 310 includes an input layer 320, one or more hidden layers 330*a-n*, and an output layer 340. Each layer of the neural network 310 (i.e., the input layer 320, the output layer 340, and the hidden layers 330*a-n*) comprises a set of nodes such that the set of nodes of the input layer 320 are input nodes of the neural network 310, the set of nodes of the output layer 340 are output nodes of the neural network 310, and the set of nodes of each of the hidden layers 330*a-n* are hidden nodes of the neural network 310. Generally, nodes of a layer may provide input to another layer and may receive input from another layer. Nodes of each hidden layer are associated with two layers, a previous layer, and a next layer. The hidden layer receives the output of the previous layer as input and provides the output generated by the hidden layer as input to the next layer. A node characteristic may represent data such as a pixel and other data processed using the neural network 310. The node characteristics values may be any values or parameters associated with a node of the neural network 310. The neural network 310 may also be referred to as a deep neural network.

Each node has one or more inputs and one or more outputs. Each of the one or more inputs to a node comprises a connection to an adjacent node in a previous layer and an output of a node comprises a connection to each of the one or more nodes in a next layer. That is, each of the one or more outputs of the node is an input to a node in the next layer such that each of the nodes is connected to every node in the next layer via its output and is connected to every node in the previous layer via its input. Here, the output of a node is defined by an activation function that applies a set of weights to the inputs of the nodes of the neural network 310. Example activation functions include an identity function, a binary step function, a logistic function, a TanH function, an ArcTan function, a rectilinear function, or any combination thereof. Generally, an activation function is any non-linear function capable of providing a smooth transition in the output of a neuron as the one or more input values of a neuron change. In various embodiments, the output of a node is associated with a set of instructions corresponding to the computation performed by the node. Here, the set of instructions corresponding to the plurality of nodes of the neural network may be executed by one or more computer processors.

In one embodiment, the input vector 310 is a vector describing an image associated with a content item. The hidden layer 330*a-n* of the neural network 310 generates a numerical vector representation of an input vector also referred to as an embedding. The numerical vector is a representation of the input vector mapped to a latent space (e.g., latent space 156).

Each connection between the nodes (e.g., network characteristics) of the neural network 310 may be represented by a weight (e.g., numerical parameter determined in training/learning process). In some embodiments, the connection between two nodes is a network characteristics. The weight of the connection may represent the strength of the connection. In some embodiments, a node of one level may only connect to one or more nodes in an adjacent hierarchy grouping level. In some embodiments, network characteristics include the weights of the connection between nodes of the neural network 310. The network characteristics may be any values or parameters associated with connections of nodes of the neural network.

During each iteration of training, the neural network 310 generates feature vectors representing the sample input data at various layers. The feature vector representation has the same number of elements for different input data sets even if the amount of data corresponding to the input data sets are of different sizes.

Generating a User Feature Vector

Figure 4A:
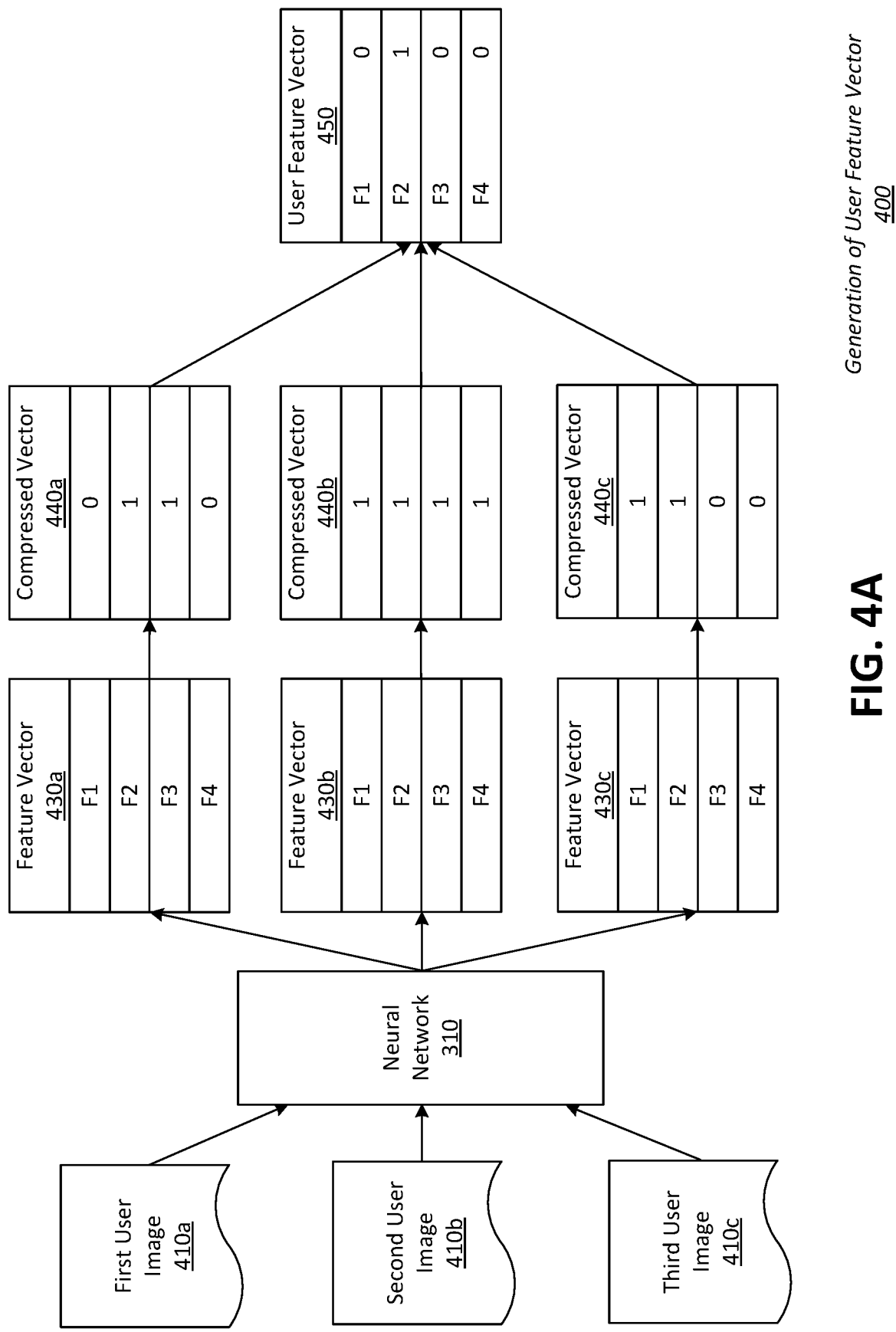
FIG. 4A illustrates the process for generating a feature vector for a user of the online system, in accordance with an embodiment.
Figure 4B:
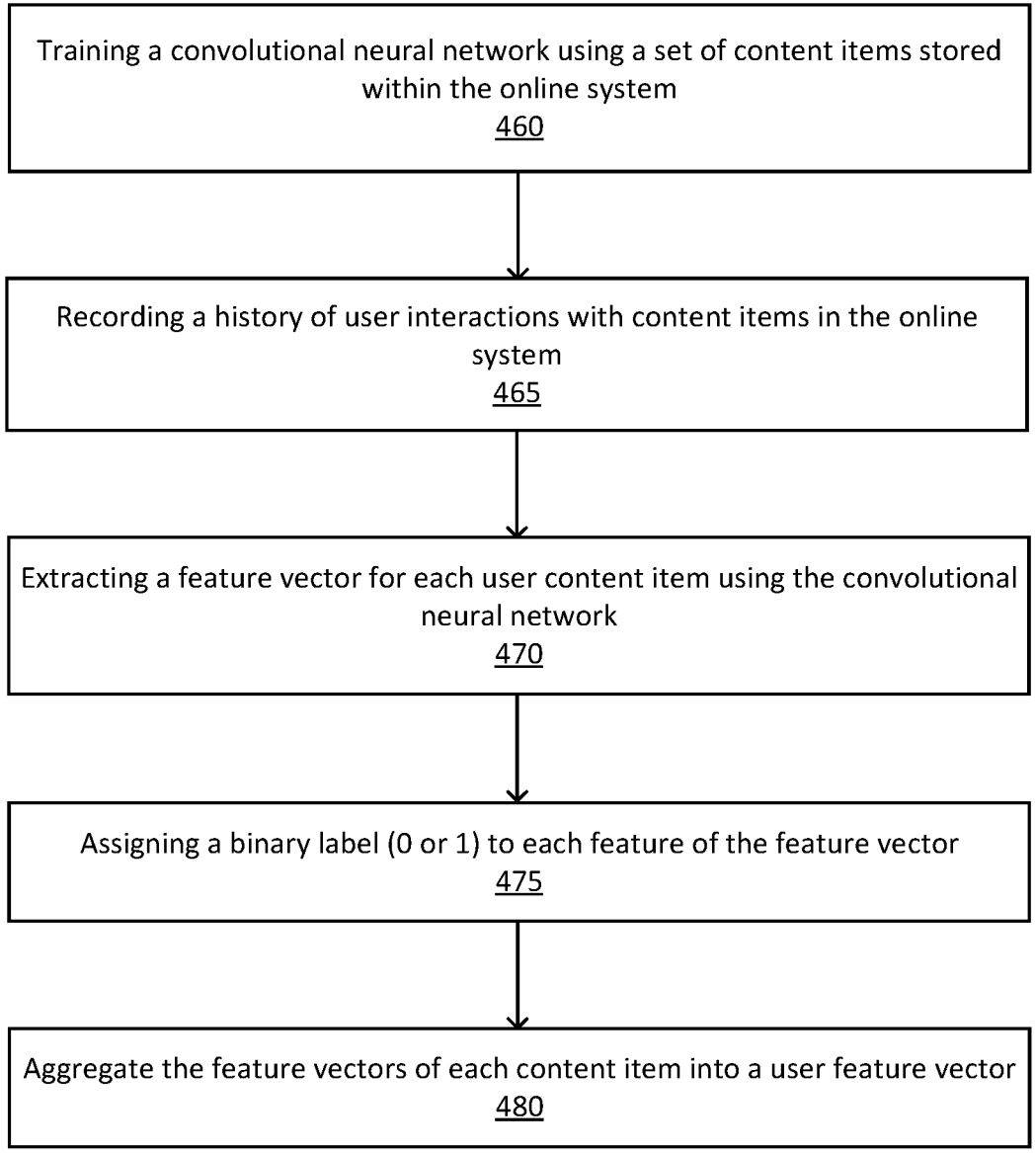
FIG. 4B shows a flowchart of the process for generating a feature vector for a user of the online system, in accordance with an embodiment.

FIG. 4A-B describe the process for generating a feature vector for a user of the online system 140, in accordance with an embodiment. FIG. 4A presents a diagram following the generation of a user feature vector. As described above, the user historical record 230 stores content items including at least one image that the user has previously interacted with within the online system 140. For each content item, an image is inputted to the input layer of the neural network 310, for example first user image 410*a*, second user image 410*b*, and a third user image 410*c*. In an embodiment, the input image is encoded as a vector, such that each element of the vector describes a pixel of the image. For each user image 410, the neural network 310 extracts a feature vector from the hidden layer, for example feature vectors 430*a*, 430*b*, and 430*c* corresponding to the user images 410*a-c*. The neural network 310 extracts feature values from the same features F1, F2, F3, and F4 for each feature vector 430*a-c*. As described above, feature values of the feature vectors, 430*a-c* are integer values within a range describing the certainty with which the neural network 310 determines the feature to be present in the image. For example, F1, F2, F3, and F4 for feature vector 430*a* have feature values 0.1, 0.7, 0.8, and 0.2, respectively. F1, F2, F3, and F4 for feature vector 430*b* have feature values 0.6, 0.7, 0.8, and 0.7, respectively. F1, F2, F3, and F4 for feature vector 430*c* have feature values 0.7, 0.8, 0.2, and 0.3, respectively.

Once extracted from the hidden layer, the feature vector is processed by the vector compression module 220 to generate the compressed vectors 440*a-c*, each compressed vector 440*a-c* based on the corresponding feature vector 430*a-c* and user image 410*a-c*. In one embodiment, the vector compression module 220 receives a threshold value against which the feature values are compared. Based on the comparison of each feature value to a threshold value, the vector compression module 220 compresses the feature vectors by replacing the range of feature values with binary labels indicating whether the feature value met a threshold level.

Continuing with the example values for F1, F2, F3 and F4 for feature vectors 430*a-c*, at a threshold value of 0.5, the binary labels associated with the compressed vectors 440*a-c* are 0 and 1, where 0 represents feature values below the threshold value of 0.5 (i.e., within the range of 0.0 to 0.5) and 1 represents feature values above the threshold value of 0.5 (i.e., within the range of 0.5 to 1). Accordingly, for feature vector 430*a*, F1 and F4 are replaced with the label "0" (0.1, 0.2<0.5), while F2 and F3 are replaced with the label "1" (0.7, 0.8>0.5). From the compressed vector 440*a*, it can be interpreted that first user image 410*a* included the features corresponding to F2 and F3, but not F1 or F4. For feature vector 430*b*, F1, F2, F3, and F4 are replaced with the label "1" (0.6, 0.7, 0.8, and 0.9>0.5). Accordingly, compressed vector 440*b* indicates that the second user image 410*b* includes features corresponding to F1, F2, F3, and F4. For feature vector 430*c*, F1 and F2 are replaced with the label "1" (0.7, 0.8>1) while F3 and F4 are replaced with the label "0" (0.2, 0.3<1). Accordingly, compressed vector 440*c* indicates that the third user image 410*c* includes features corresponding to F1 and F2, but not to F3 or F4.

In another embodiment, the vector compression module 220 is a learned transformation function which receives a feature vector and translates each feature value of the feature vector into a binary label, for example a "0" or a "1". The vector compression module 220 may identify two or more ranges of feature values which indicate, with a strong likelihood, that a feature is or is not present and assign either or a "0" or a "1" label to any feature value within that range. The vector compression module 220 may be trained using a training dataset comprising previously and accurately compressed feature vectors. Feature vectors within the training dataset may be assigned binary labels based on review by an authorized user. Using the training dataset, the vector compression module 220 generates a mapping between all potential feature values and a binary label, such that the mapping is referenced and used to assign binary labels to each extracted feature vector. In another embodiment, the vector compression module 220 identifies, based a training dataset, two clusters of feature values: one cluster which includes feature values indicative that a feature is present and a second cluster which includes feature values indicative that a feature is not present. After receiving a feature vector, the vector compression module 220 may assign a binary label to each feature value based on the identified pair of clusters. In another embodiment, the label generated for a feature has more than two possible values, for example, four or eight values. Accordingly, the feature requires two bits or three bits for representing the four or eight values respectively. As a result, the vector compression module 220 achieves compression since the number of bits used to represent the feature may be reduced from 8 or 16 bits to 2 or 3 bits. In an embodiment, the vector compression module 220 is a trained model that maps an input image to one of a plurality of clusters of images, for example, four clusters.

The user feature vector generator 235 aggregates compressed feature vectors 440*a-c* to generate the user feature vector 450, as illustrated. In some embodiments, more or fewer compressed vectors 440*a-c* may be aggregated to generate the user feature vector 450. Because the user feature vector 450 represents an aggregation of items with which the user has interacted, the user feature vector 450 may describe user interests in various features of content items at various levels of certainty. In an embodiment, the user feature vector 450 comprises binary labels and therefore requires less storage space within computer memory than initially generated feature vectors 430*a-c* as was described in reference to the compressed vectors 440*a-c*. In alternate embodiments, the user feature vector 450 comprises a range of integers, for example a percentage, as described above in reference to the initially extracted feature vectors of the feature vector store 215. In such embodiments, each feature value within the user feature vector 450 may be compared to a threshold value bifurcating the range of values and assigning a binary label to each side of the bifurcated range as described above. Alternatively, both content feature values and user feature values may be integers or floating point values. The user feature value is obtained by aggregating the corresponding content feature values and optionally normalizing the aggregated value so that the content feature value and the user feature value are comparable. The system compares each content feature value with the corresponding user feature value to determine whether the user is likely to be interested in the content item. In yet another embodiment, the user feature values and content feature values are alphanumeric values that are comparable. As described above, in one implementation, the user feature vector generator 235 implements a binary "AND" operator to generate the feature vector describing the user. Because the binary "AND" operation requires that both inputs be a 1 to output a result of a 1 (e.g., a first input of 1 and a second input of 0 result in a product output of 0, a first input of 0 and a second input of 0 result in a product output of 0, but a first input of 1 and a second input of 1 result in a product output of 1), the user feature vector 450 only includes features present in all images stored within the historical record and therefore a higher level of accuracy. The illustrated embodiment describes the implementation of the binary "AND" operation. Because only F2 was assigned a label of 1 in each of compressed vector 440*a*, 440*b*, and 440*c*, the user feature vector 450 only includes the label "1" for feature F2. Because F1 was not present in compressed vector 440*a*, and therefore assigned the label "0", the "AND" operation results in the label "0" for F1 in the user feature vector 450. Similarly, neither F3 nor F2 are present in the compressed vector 440*c*, and therefore assigned the label "0", the "AND" operation results in the label "0" for F3 and F4 in the user feature vector 450. In this embodiment, the user feature vector describes features that are present in every image from which a feature vector was extracted. Therefore, the user feature vector 450 describes a set of features of content items in which the user has expressed a high level of interest. In an embodiment, the user feature vector generator 235 determines a percentage of values of a feature of the content items that the user interacted with. The user feature vector generator 235 determines the value of the user feature as a binary value by comparing the percentage value with a threshold value. In an embodiment, the user feature vector generator 235 determines a weighted aggregate value corresponding to a feature of content items with which the user interacted to determine a score for the feature. The weight assigned to a content item may depend on the type of interaction, for example, a user interaction posting a comment is assigned higher weight compared to a user interaction representing accessing the content item. The user feature vector generator 235 may further use a threshold value to convert the score to a binary value, for example, score values greater than or equal to the threshold are converted to 1 and score value below the threshold are converted to 0.

In an alternate implementation, the user feature vector generator 235 implements a binary "OR" operation to generate the feature vector describing the user. Because the binary "OR" operation requires that only one input be a 1 to output a result of a 1 (e.g., a first input of 1 and a second input of 0 result in a product output of 1, a first input of 1 and a second input of 1 result in a product output of 1, but a first input of 0 and a second input of 0 result in a product output of 0), the user feature vector 450 includes features present in at least one image stored within the historical record and therefore a lower level of accuracy. Despite the lower level of accuracy, the user feature vector 450 in this implementation describes a broader set of features in which the user has expressed an interest. Assuming a binary "OR" operator was implemented to generate the user feature vector 450 using the illustrated labels of the compressed vectors 440a-c, the user feature vector 450 would instead include the label "1" for each of F1, F2, F3, and F4 because all of the features F1, F2, F3, and F4 were present in the second user image 410b associated with the compressed vector 440b.

In another implementation, the user feature vector generator 235 may determine an average value of the binary labels for each feature based on the feature vectors for the content which the user has interacted with and compares the average value to a threshold feature value. Averages above the threshold feature value may be assigned a label of "1" and averages below the threshold feature value may be assigned a label of "0". The average value determined from a set of binary labels ranges between 0.0 and 1.0, for example 0.6. If the threshold feature value, received from an authorized user or determined over time using a machine learned model, is 0.5, the feature would be assigned a label of "1" in the user feature vector. If the threshold feature value was 0.7, the feature would be assigned a label of "0".

FIG. 4B describes a flow chart of the process for generating a user feature vector, according to an implementation. In implementations in which the feature extractor 210 implements a neural network 310 and extracts the feature vector from a hidden layer 330, the convolution neural network 310 is trained 460 using a set of content items stored within the online system 140. Training of the neural network 310 can occur over multiple iterations using different content items. The online system 140 records 465 a history of user interactions with content items in the online system 140. As described above interactions between a content item and a user may take various forms, but in each case express a user's interest in the content item. Different types of interactions may express different levels of interests, for example forwarding a content item to another user may indicate a higher level of interest than merely viewing a content item. In some implementations, the user historical record 230 stores not only a record of content items with which the user has interacted but also representations of the content items to be provided to the feature extractor 210. As described herein, content items stored within the user historical record 230 are referred to as "user content items." The user historical record 230 is dynamically updated at periodic intervals as a user is presented with new content items from the content store 205. For example, when the content distribution module 255 presents a content item to the user, as will be described further in reference to FIG. 5A-B, the user historical record 230 is updated to include the content item. The user historical record 230 may store both content items and content items generated by other users of the online system 140 that have been presented to the user.

For each user content item, the feature extractor 210 extracts 470 a feature vector from the hidden layer of the neural network 310. The vector compression module 220 assigns binary labels to each feature value of the extracted feature vector to compress the data of the feature vector and to reduce the amount of memory required to store the feature vector in computer memory. For example, the vector compression module 220 assigns the binary labels "0" and "1" representing that a feature value was below a threshold confidence value and above a threshold confidence level, respectively. The user feature vector generator 235 aggregates the compressed vector for each user content item into a user feature vector by performing binary operations on the labels of each feature value and populating the user feature vector with feature values that are the products of the binary operations. The description of steps 470, 475, and 480 are consistent with the descriptions of the feature extractor 210, the vector compression module 220, the user feature vector generator 235, and FIG. 4A as described above.

Content Distribution to Users of the Online System

Figure 5A:
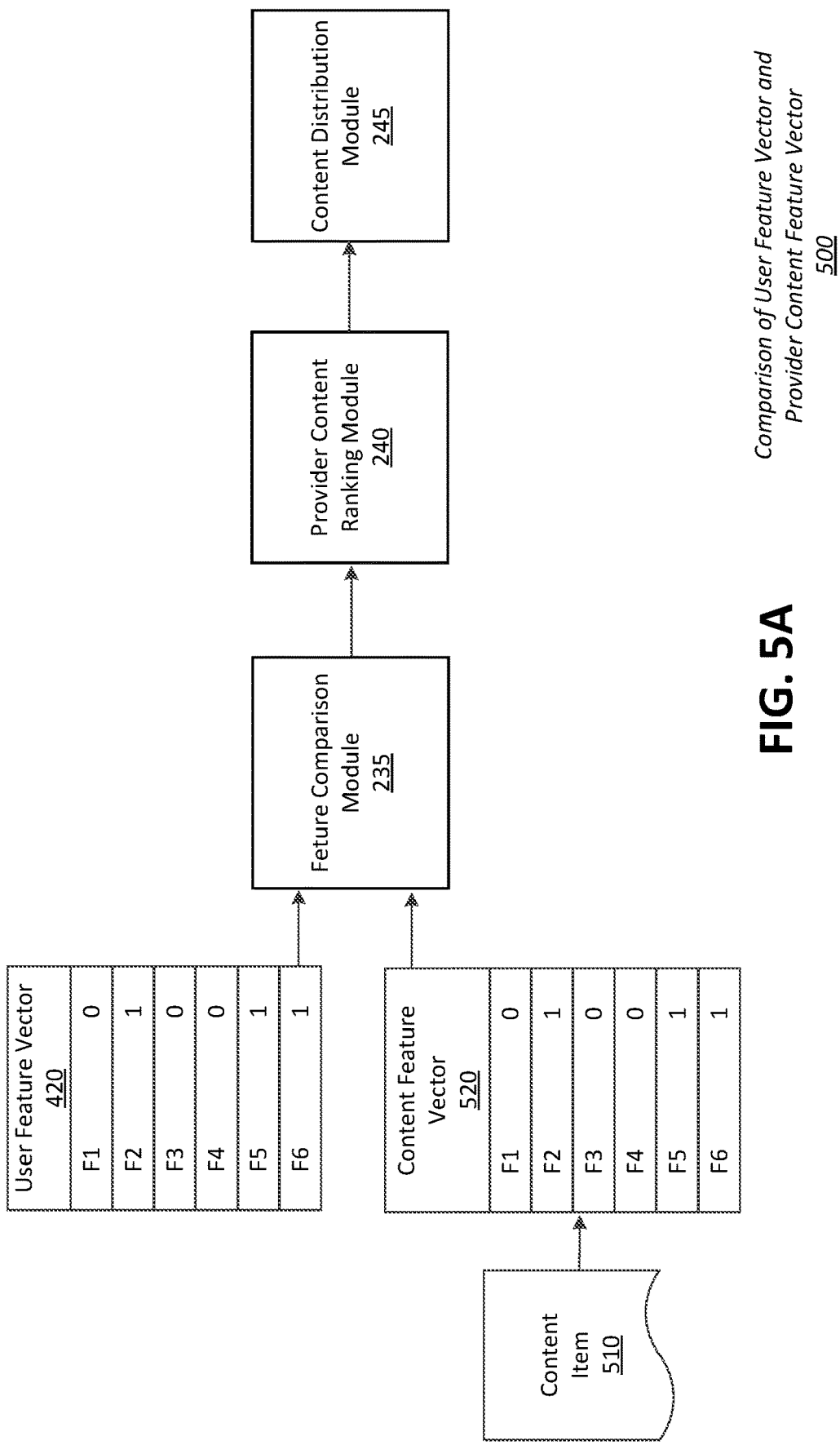
FIG. 5A illustrates the process for distributing content to a user of the online system, in accordance with an embodiment.
Figure 5B:
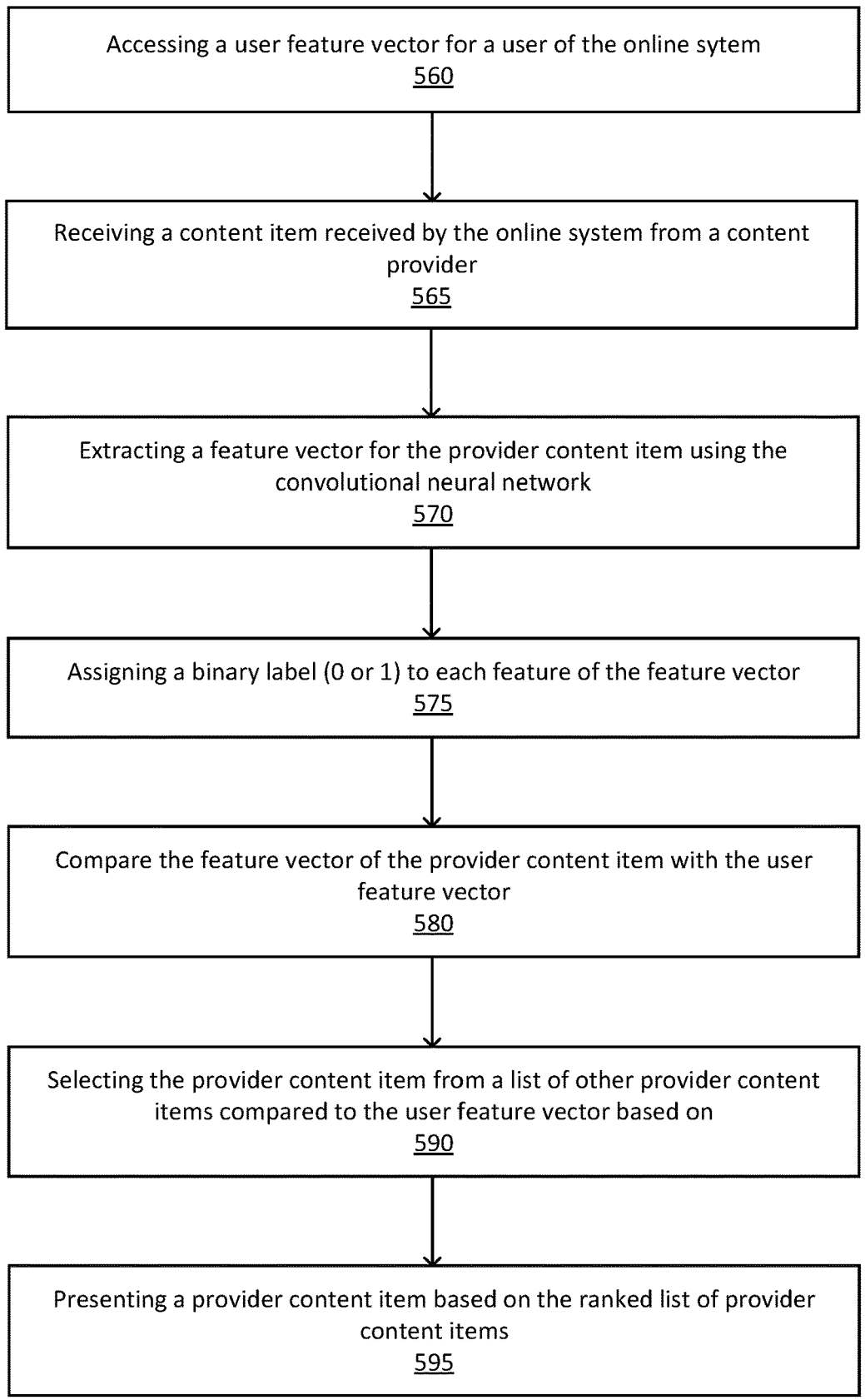
FIG. 5B shows a flowchart of the process for distributing content to a user of the online system, in accordance with an embodiment.

FIG. 5A-B are flow charts of the process for distributing a content to a user of the online system 140, in accordance with an embodiment of the invention.

FIG. 5A-B describe the process for distributing content to a user of the online system 140, in accordance with an embodiment. FIG. 5A presents a diagram following the comparison of a user feature vector 420 and a content feature vector 520 to distribute content to a user of the online system 140. As described above, the content item 510 contains multiple content items 510 to be targeted towards users of the online system 140 and each content item 510 includes at least one image to be viewed by the user. Content items may describe goods, services, news, or additional information that could be of interest to the user that has been created by or provided by a third-party provider with an account for the online system 140. In some embodiments, third party providers may be an individual entity or an organization entity, for example a business, school, or program. To improve the efficiency with which content item 510 is targeted to a user and the likelihood that the user will interact with the content item 510 to express their interest, images within content item 510 are analyzed for certain features which the user has historically shown an interest in. As discussed above, this content distribution problem is addressed by comparing a user feature vector with the content feature vector.

The content item 510 is inputted into the feature extractor 210, which generates the content feature vector 520. Consistent with the description of the vector compression module 220 in regards to the user feature vector in regards to FIG. 4A, the vector compression module 220 assigns binary labels to the feature values of the content feature vector, resulting in content feature vector 520 as illustrated. The compressed feature vectors for the user feature vector 520 and the content feature vector 520, are both inputted to the feature comparison module 245. In one embodiment, the feature comparison module 245 can be configured to receive the non-compressed feature vectors for both the user feature vector 420 and the content feature vector 520.

The feature comparison module 245 receives both the user feature vector 420 and the content feature vector 520 and compares the binary feature values for each feature. Based on the number of similarities between the binary values of the user feature vector 420 and the content feature vector 520, the feature comparison module 245 determines a comparison score for the content item 510. The feature comparison module 245 may determine a comparison score for the content item 510 by incrementing the number of matching binary labels indicating the presence of a feature between the user feature vector 420 and the content feature vector 520. For example, the user feature vector 420 and content feature vector 520 as illustrated in FIG. 5A, would have a score of 3, because F2, F5, and F6 were assigned the label "1" in each of the user feature vector 420 and the content feature vector 520.

In one embodiment, the feature comparison module 245 may weigh feature values of content depending on the significance of the feature values to the user. For example, the user historical record 230 may indicate that a user is more interested in images including a feature representing a dog than images including a feature representing ball. As a result, content item including a dog and a ball may be scored higher than an image including just a dog which may be scored higher than an image including just a ball. In an embodiment, the system determines the weight of a feature value based on statistical information describing the feature value for all content items that the user interacted with. For example, if all content items that the user interacted with have a consistently high feature value, the system assigns higher weight to that feature value. In contrast, if the feature value is more uniformly distributed across a range of values, the system determines that this particular feature is not very significant for the user and assigns a lower weight to the feature.

Based on the comparison scores of each content items stored within the content store 205, the content ranking module 250 ranks content items in ascending order or descending order. In one embodiment, the content ranking module 250 selects the content item 510 with the highest comparison score of the content store 205. In alternate embodiments, the content ranking module 250 may select multiple content items 510 depending on the number of opportunities with which the online system 140 may present content to the user. Finally, the content distribution module 255 receives the content items 510 eligible to be presented to the user and distributes the content through the online system 140.

FIG. 5B describes a flow chart of the process for generating a user feature vector, according to an implementation. In implementations in which the user feature vector 420 is generated prior to the comparison of a content item, the feature comparison module 245 accesses 560 a user feature vector against which the content feature vector will be compared. Consistent with the description in regards to user content items, the feature extractor 210 receives 565 from the content store 205 and extracts 570 a feature vector for the content item using the neural network 310. The vector compression module 220 assigns 575 a binary label to each feature value of the content feature vector 520. Using the binary labels for corresponding features of the user feature vector 420 and the content feature vector 520, the feature comparison module 245 compares 580 the feature vector of the content item with the user feature vector and determines a comparison score based on the number of weight of matching features. The content ranking module 250 selects 590 one or more content items based on the number of available opportunities for the online system 140 to present content items to the user and the comparison scores for each content item and the content distribution module 255 presents 595 the content item to the user of the online system 140.

Alternative Embodiments

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
   receiving, from a third party content provider, a plurality of content items, each content item comprising at least one image;
   for each of the plurality of content items:
      extracting a feature vector from an image input to a neural network, wherein the feature vector comprises an array of feature values; and
      based on the extracted feature vector, generating a compressed feature vector comprising a label assigned to each feature value, wherein each label represents whether the corresponding feature value was above a threshold value;
   identifying a set of content items that a user interacted with;
   determining a user feature vector by aggregating the feature vectors corresponding to the set of content items;
   receiving a new set of content items;
   for each content item of the new set of content items, comparing the compressed feature vector for the content item with the user feature vector;
   selecting one or more content items from the new set of content items based on the comparison of the compressed feature vector corresponding to the content items with the user feature vector; and
   sending the one or more selected content items to the user.

2. The method of claim 1, wherein the user feature vector comprises an array of labels assigned to each feature of the vector and represents a set of interests associated with the user of an online system.

3. The method of claim 1, wherein aggregating the feature vectors to determine a user feature vector comprises:
   for each content item of the set of content items, identifying features from the compressed feature vector with a label indicating that the corresponding feature value was below the threshold value; and
   removing the identified features from the compressed feature vector; and
   for the remaining features, aggregating features common to all content items of the plurality into the user feature vector.

4. The method of claim 1, wherein aggregating the feature vectors to determine a user feature vector comprises:
   determining an average for each feature value of the feature vector, the average value based on feature vectors for the set of content items; and
   assigning the label to each feature based on a comparison of the average and the threshold value.

5. The method of claim 1, wherein the label assigned to a feature value in a compressed feature vector is a binary label indicating whether the corresponding feature value was above the threshold value.

6. The method of claim 1, wherein the compressed feature vector for a content item is compared to the user feature vector using a binary "and" operator.

7. The method of claim 1, wherein the compressed feature vector occupies less storage space in computer memory than the feature vector.

8. The method of claim 1, wherein the neural network is a convolutional neural network.

9. The method of claim 1, wherein the neural network is trained using a set of content items, each content item associated with a pre-determined label representing whether the corresponding feature value was above the threshold value.

10. A computer-implemented method comprising:
    receiving, from a third party content provider, a plurality of content items, each content item comprising at least one image;
    for each of the plurality of content items:
       extracting a feature vector for each content item, wherein the feature vector comprises an array of feature values;
       based on the extracted feature vector, generating a compressed feature vector comprising a label assigned to each feature value, wherein each label represents whether the corresponding feature value was above a threshold value;
    accessing, from a database of feature vectors, a user feature vector for a user representing an aggregate of a plurality of compressed feature vectors, each compressed feature vector including binary labels assigned to each feature value and corresponding to an image with which the user previously interacted;
    comparing each compressed feature vector and the user feature vector;
    selecting one or more content items from the received plurality of content items based on the comparison of the compressed feature vector corresponding to the content items with the user feature vector; and
    sending the one or more selected content items to the user.

11. The computer-implemented method of claim 10, further comprising:
    receiving a set of content items that the user interacted with, each content item comprising at least one image;
    for each content item of the set, extracting a feature vector, wherein the feature vector comprises an array of feature values describing the presence of each feature in an image associated with a content item;
    for each content item of the set, compressing the feature vector by assigning a label to each feature value, wherein the label is a binary label representing whether the corresponding feature value was above the threshold value; and
    generating the user feature vector by aggregating the compressed feature vectors for each content item of the set.

12. The computer-implemented method of claim 11, wherein aggregating the feature vectors to determine a user feature vector comprises:
    for each content item of the set of content items, identifying features from the compressed feature vector with a label indicating that the corresponding feature value was below the threshold value; and
    removing the identified features from the compressed feature vector; and
    for the remaining features, aggregating features common to all content items of the plurality into the user feature vector.

13. The computer-implemented method of claim 11, wherein aggregating the feature vectors to determine a user feature vector comprises:
    determining an average for each feature value of the feature vector, the average value based on feature vectors for the set of content items; and
    assigning the label to each feature based on a comparison of the average and the threshold value.

14. The computer-implemented method of claim 10, wherein the compressed feature vector for a content item is compared to the user feature vector using a binary "and" operator.

15. The computer-implemented method of claim 10, wherein the compressed feature vector occupies less storage space in computer memory than the feature vector.

16. The computer-implemented method of claim 10, wherein the image associated with each content item is provided as input to a neural network to extract the feature vector.

17. The computer-implemented method of claim 16, wherein the neural network is a convolutional neural network.

18. The computer-implemented method of claim 16, wherein the neural network is trained using a set of content items, each content item associated with a pre-determined label representing whether the corresponding feature value was above a threshold value.

19. A non-transitory computer readable medium storing instructions comprising:
   receiving, from a third party content provider, a plurality of content items, each content item comprising at least one image;
   for each of the plurality of content items:
      extracting a feature vector from an image input to a neural network, wherein the feature vector comprises an array of feature values;
      based on the extracted feature vector, generating a compressed feature vector comprising a label assigned to each feature value, wherein each label represents whether the corresponding feature value was above a threshold value;
   identifying a set of content items that a user interacted with;
   determining a user feature vector by aggregating the feature vectors corresponding to the set of content items;
   receiving a new set of content items;
   for each content item of the new set of content items:
      comparing the compressed feature vector for the content item with the user feature vector; and
      determining a score for the content item based on the comparison;
   selecting one or more content items from the new set of content items based on the score values for the content items; and
   sending the one or more selected content items to the user.

20. The non-transitory computer readable medium of claim 19, wherein aggregating the feature vectors to determine a user feature vector comprises:
   for each content item of the set of content items, identifying features from the compressed feature vector with a label indicating that the corresponding feature value was below the threshold value; and
   removing the identified features from the compressed feature vector; and
   for the remaining features, aggregating features common to all content items of the plurality into the user feature vector.

* * * * *